United States Patent [19]
West

[11] Patent Number: 5,995,294
[45] Date of Patent: Nov. 30, 1999

[54] GRADIENT INDEX LENS REFLECTOR

[76] Inventor: Donald Lee West, 3060 Pine Ridge Rd., Winchester, Ky. 40391

[21] Appl. No.: 09/093,672

[22] Filed: Jun. 8, 1998

Related U.S. Application Data

[60] Provisional application No. 60/054,651, Aug. 14, 1997.
[51] Int. Cl.⁶ ............................ G02B 3/00; G02B 17/00
[52] U.S. Cl. ........................... 359/642; 359/652; 359/726
[58] Field of Search ........................... 359/642, 726–736, 359/652

[56] References Cited

U.S. PATENT DOCUMENTS

| | | | |
|---|---|---|---|
| 3,658,407 | 4/1972 | Kitano et al. ........................... | 385/116 |
| 3,801,181 | 4/1974 | Kitano et al. ........................... | 359/425 |
| 4,258,978 | 3/1981 | Cole ........................................ | 385/116 |
| 4,462,662 | 7/1984 | Lama ....................................... | 359/653 |
| 4,639,094 | 1/1987 | Aono ....................................... | 359/654 |
| 4,789,219 | 12/1988 | Layne ..................................... | 350/97 |
| 5,159,495 | 10/1992 | Hamblen ................................. | 359/731 |

*Primary Examiner*—Georgia Epps
*Assistant Examiner*—Suzanne Letendre
*Attorney, Agent, or Firm*—Kenneth F. Pearce

[57] ABSTRACT

A gradient index lens which reflects light and focuses a corresponding image. The reflector can be easily incorporated to optical devices, and is particularly suitable for encoders position detectors, or other instrumentation utilizing line gratings.

20 Claims, 1 Drawing Sheet

GRADIENT INDEX LENS REFLECTOR

This Application for Letters Patent relates back to Provisional Application, Ser. No. 60/054,651, West, Donald, filed on Aug. 14, 1997 which was entitled—Gradient Index Lens with Reflective Surface—on the date the Provisional Application was filed.

BACKGROUND OF THE INVENTION

1. Field of the Invention

The present invention is directed toward a gradient index lens which is modified to reflect light and to focus a corresponding image. Until the present reflector, state-of-the-art uses for gradient index lens were limited to diode to fiber couplings, fiber to detector couplings, fiber to fiber couplings, lens to lens couplings, or focusing and collimating applications. Prior art has been dedicated to minimizing reflections by angling the lens facet or encasing the gradient index lens with an anti-reflection coating. Within the scope of the present unity of invention, the reflector can be easily incorporated to optical devices, and is particularly adapted to encoders, position detectors, or other instrumentation utilizing line gratings.

2. Description of the Previous Art a) U.S. Pat. No. 3,658,407-Kitano, et. al., discloses an image transmitter composed of optical fibers. The bundles of fibers are arranged neatly whereby the image formed at one end of the bundle is transmitted to the other end of the bundle.

b) U.S. Pat. No. 3,801,181-Kitano, et. al., discloses a gradient index light conductor.

c) U.S. Pat. No. 4,258,978-Cole, discloses an image reversing array utilizing gradient refractive index. Cole contains an array of optical elements with imaging properties in one meridian and light-containment properties in another meridian. Thus, the inversion of the image occurs across the width but not the length of a slit aperture. U.S. Pat. No. 4,258,978 was directed toward the photocopying industry.

d) U.S. Pat. No. 4,462,662-Lama, discloses a lens array composed of at least two distinct groups of fibers having differing gradient index values. Lama teaches the combination of differing gradient index values and radial parameters blended to form the lens array results in uniform exposure along the imaging plane.

e) U.S. Pat. No. 4,639,094-Aono, discloses a gradient index lens system. Aono teaches the cementing together of two gradient index lens manufactured with different gradient indexes. U.S. Pat. No. 4,639,094 argues the combination of the cemented lens reduces spherical aberration.

SUMMARY OF THE INVENTION

As previously indicated, the present invention is directed toward a gradient index lens which can reflect light. Until the present reflector, examples of current state-of-the-art uses for gradient index lens included diode to fiber couplings, fiber to detector couplings, fiber to fiber couplings, lens to lens couplings, as well as focusing and collimating functions. It appears the prior art has been dedicated to minimizing reflections by angling the lens facet or encasing the gradient index lens with an anti-reflection coating. Thus, the prior art teaches any reflection associated with gradient index lens is an undesirable limitation. Moreover, earlier gradient index lenses and their functional systems have gone to gargantuan lengths to make the image plane coincide with both the proximal and distal ends of the lens, respectively. In effect, the current state-of-the-art teaches in an opposite direction of the present reflector which can make the image plane fall outside the gradient index lens. Therefore, the present invention meets a previously unmet and long felt need within the industry. Within the scope of the present unity of invention, the reflector can be easily incorporated to optical devices, and is particularly adapted to encoders, position detectors, or other instrumentation utilizing line gratings.

An object of the present invention is to provide a gradient index lens reflector which has an image plane outside the lens.

Another object of the present invention is to provide a gradient index lens reflector having planar ends.

Yet another object of the present invention is to provide a gradient index lens reflector having a reflective surface in relation to the lens.

Still another object of the present invention is to provide a gradient index lens reflector having a reflective surface within the lens.

Yet another object of the present invention is to provide a gradient index lens reflector having a reflective surface attached to one end of the lens.

It is another object of the present invention to provide a gradient index lens reflector of simple construction.

Yet still another object of the present invention is to provide a gradient index lens reflector of minute dimensions.

It is yet another object of the present invention to provide a gradient index lens reflector of inexpensive construction.

It is still another object of the present invention to provide a gradient index lens reflector capable of sustaining the rigorous vibrations of the industrial workplace thereby minimizing realignment or re-calibration.

Yet still another object of the present invention to provide gradient index lens reflectors of varying pitches capable of focusing the image on a plane outside the reflector.

It is still another object of the present invention to eliminate spherical aberration previously associated with conventional glass lens.

Yet another object of the present invention is to provide a gradient index lens reflector capable of reflecting a corresponding image.

Still another object of the present invention is to provide a gradient index lens reflector compatible with existing light emitting diodes or lasers.

It is still another object of the present invention to a provide a gradient index lens reflector where the reflected corresponding image is spatially proximate to the ingressing image.

It is yet another object of the present invention to provide a gradient index lens reflector where the corresponding image is inverted relative to the ingressing image.

As used herein, "ingressing image" shall mean the image focused within the gradient index lens reflector due to incoming light received by the gradient index lens reflector.

As used herein, "corresponding image" shall mean the egressing image reflected by the gradient index lens reflector and focused either on the planar surface of the gradient index lens or in a focal plane outside the gradient index lens reflector.

An embodiment of the present invention can be described as a reflector, comprising: gradient index lens having a reflective surface in spacial relation to the gradient index lens. It is the novel and unique interaction of these simple elements which creates embodiments within the ambit of the present unity of invention.

Pursuant to Title 35 of the United States Code, descriptions of preferred embodiments follow. However, it is to be understood that the best mode descriptions do not limit the scope of the present invention. The breadth of the present invention is identified in the claims appended hereto.

DESCRIPTION OF THE PREFERRED EMBODIMENTS

Although the disclosure hereof is detailed to enable those skilled in the art to practice the invention, the embodiments published herein merely exemplify the present invention which can be practiced in other specific structures.

The unique characteristics of gradient index lenses have led to their widespread use in coupling fiber optics, document scanning, liquid crystal display imaging and endoscopy to name some of their present day uses.

Figure 1:
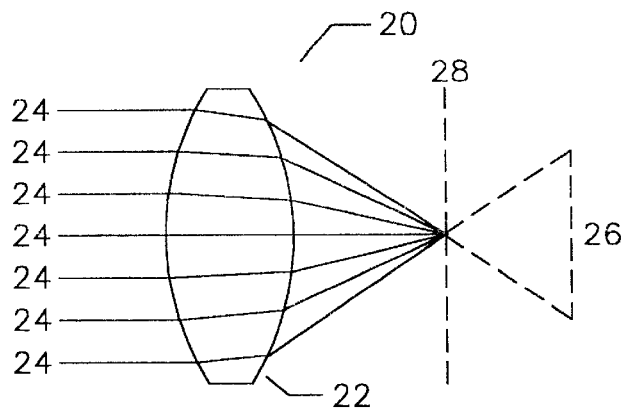
FIG. 1 illustrates the bending of light by a conventional convex lens.

Beginning with FIG. 1, as an instructive point of reference, a side view of conventional convex glass lens (20) is shown. By carefully controlling the curvature and smoothness of lens surface (22) incoming light rays (24) are focused into an image plane (26). As has been well known for centuries, conventional lens bend light only at their surfaces which results in a focal plane (28) outside the lens. At the same time, because of the surface curvatures of conventional lenses, their resultant focal images will include distortions known, within the art, as spherical aberrations. Due to this inherent phenomenon, use of conventional lenses is seriously impaired when high resolutions are required.

Figure 2:
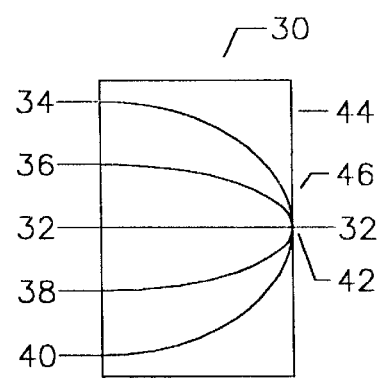
FIG. 2 illustrates the bending of light by a gradient index lens.

Turning now to FIG. 2, a side view of gradient index lens (30) is shown. Because of the carefully monitored composition and precise engineering of the raw oxide glass, the index of refraction for gradient index lens (30) is highest along central axis (32) of gradient index lens (30) and decreases as function of radial distance from central axis (32). Those skilled in the art recognize this as the radial index gradient.

Due to the resultant radial index gradient of gradient index lens (30), light rays (34), (36), (38) and (40) are perpetually directed toward focal point (42) of gradient index lens (30). In the prior art, gradient index lens (30) will typically have image plane (44) fall in conjunction with planar end (46) of gradient index lens (30) whereas conventional lens (20) has an image plane (26) outside the structure the conventional lens (20).

Figure 3:
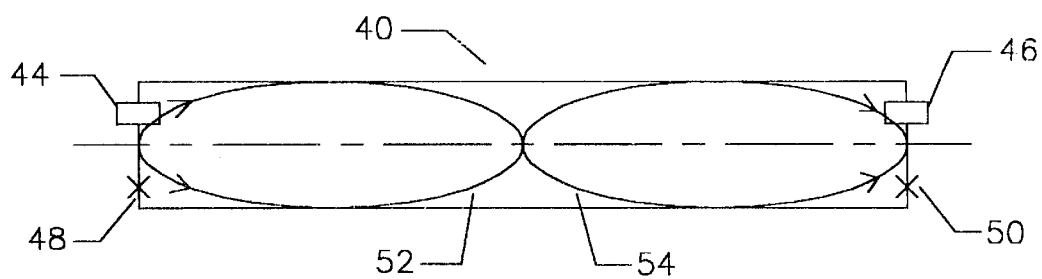
FIG. 3 is illustrates the sinusoidal pathways of light flowing through a gradient index lens having a 1.0 pitch.

With reference to FIG. 3, the paraxial optics of gradient index lens (40) having a pitch of 1.0 are depicted. Along with the previously identified engineering and composition components of gradient index lenses, images (44) and (46) on planar surfaces (48) and (50) of gradient index lens (40) are further controlled as a function of the length and pitch of gradient index lens (40). As shown, light rays (52) and (54) travel through gradient index lens (40) following sinusoidal cycles. For those skilled in the art, it is well established that light flowing through gradient index lenses follows sinusoidal trajectories. Equally well known is that one complete sinusoidal cycle is equivalent to one pitch. By way of illustration, for gradient index lens (40) having a 1.0 pitch, anterior image (44) at anterior planar surface (48) and posterior image (46) at posterior planar surface (50) of gradient index lens (40) are both vertical.

Gradient index lenses presently available have a radial index constant which is calculated as a function of the index of refraction. The index constant, also known as the gradient constant, determines how quickly light rays with converge to a point of focus for any particular wavelength. Thus, the diameter as well as the gradient constant affect the dispersion of light within gradient index lenses. Simultaneously, if the cylindrical lengths of the lenses are different, lenses having equivalent compositions with identical gradient constants can have different pitches. And along the same vein, gradient index lenses having any pitch other than 1.0 will not render vertical posterior images.

Figure 4:
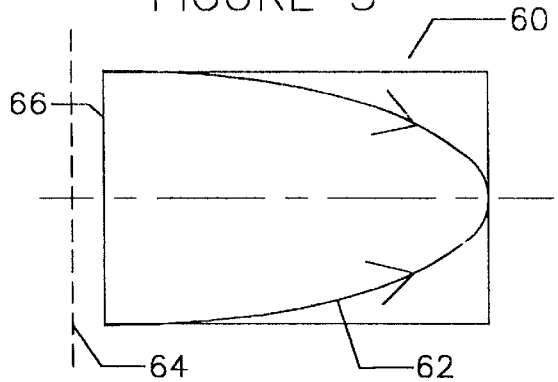
FIG. 4 illustrates the sinusoidal pathways of light flowing through a gradient index having a pitch of 0.25.
Figure 5:
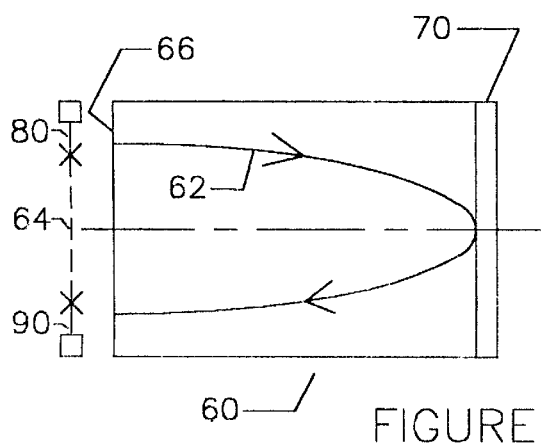
FIG. 5 illustrates a gradient index lens having a pitch of 0.25 with a reflective surface attached to one end of the lens.

Turning now to FIGS. 4 and 5, a preferred embodiment of the present invention is disclosed. FIG. 4 discloses the sinusoidal pathway (62) for light flowing through gradient index lens (60) which further includes a 0.25 pitch. It has unexpectedly been discovered that a gradient index lens having about a 0.25 pitch supplies an exceptional performance for the gradient index lens (60). However, a gradient index lens of any pitch, e.g. 0.75 pitch, capable of focusing a corresponding image in a plane (64) outside gradient index (60) lens or on planar surface (66) of the gradient index lens (60) can be incorporated into this embodiment.

FIG. 5 depicts gradient index lens (60) having reflective surface (70) attached to one of gradient index lens (60) end and focal plane (64) residing outside of gradient index lens (50). At this juncture, those skilled in the art will easily recognize reflective surface (70) could also be be positioned proximal to or within gradient index lens (60). However, attaching reflective surface (70) to gradient index lens (60) provides the simplest embodiment for the gradient index lens reflector. Although not shown in FIG. 5, the gradient index lens reflector will still function, if the focal plane for the corresponding image is coincident with planar surface (66) of gradient index lens (60). In this preferred operation, reflective surface (70) is aluminum, but any other reflective matter can be utilized with this embodiment.

By way of instruction, to better enable one skilled in the art to more easily utilize the present invention, selected and specific dimensions of this embodiment for the gradient index lens reflector are: numerical aperture of 0.37, diameter of 2.0 millimeters, length of 6 millimeters and 0.25 pitch. Moreover, by carefully controlling the previously identified variables, i.e., diameter, length, gradient constant and pitch, the magnification of the present gradient index lens reflector is regulated.

Returning now to FIG. 5, pathway (62) for light traveling through the gradient index lens reflector having a 0.25 pitch is shown. As depicted, corresponding image (90) is inverted relative to the vertical ingressing image (80). Importantly, it has been determined this rotation of 180 degrees of corresponding image (90) relative to ingressing image (80) significantly improves the alignment between corresponding image (90) and ingressing image (80). Those skilled in the art recognize this as self-alignment and understand the application of this phenomenon toward other optic devices compatible with the present gradient index lens reflector.

Having disclosed the invention as required by Title 35 of the United States Code, Applicant now prays respectfully that Letters Patent be granted for his invention in accordance with the scope of the claims appended hereto.

What is claimed is:

1. A reflector, comprising a gradient index lens having at least one planar end and a reflective surface within said gradient index lens.

2. A reflector, comprising: a gradient index lens having a first and a second planar end further including a reflective surface aligned with said first planar end for focusing a corresponding image in a plane outside said second end of said gradient index lens opposite said reflective surface.

3. The invention of claim 2 wherein said reflective surface is attached to said first planar end of said gradient index lens.

4. The invention of claim 3 further comprising a pitch for focusing said corresponding image in said plane outside said gradient index lens.

5. The invention of claim 4 wherein said corresponding image is inverted.

6. The invention of claim 5, said reflector further comprising a length of not more than 7 millimeters and a diameter of not more than 2 millimeters.

7. The invention of claim 6 wherein said pitch is 0.25.

8. The invention of claim 6 wherein said pitch is 0.75.

9. A reflector, comprising: a gradient index lens having a first and a second planar end further including a reflective surface aligned with said first planar end for focusing a corresponding image on said second end of said gradient index lens opposite said reflective surface.

10. The invention of claim 9 wherein said reflective surface is attached to said first planar end of said gradient index lens.

11. The invention of claim 10 further comprising a pitch for focusing said corresponding image on said second end of said gradient index lens.

12. The invention of claim 11 wherein said corresponding image is inverted.

13. The invention of claim 12, said reflector further comprising a length of not more than 7 millimeters and a diameter of not more than 2 millimeters.

14. The invention of claim 13 wherein said pitch is 0.25.

15. The invention of claim 13 wherein said pitch is 0.75.

16. A reflector, comprising: a gradient index lens including a pitch having a first and a second planar end further comprising a reflective surface attached to said first planar end for focusing an inverted corresponding image in a plane parallel to said second end of said gradient index lens.

17. The invention of claim 16 wherein said pitch is 0.25.

18. The invention of clam 16 wherein said pitch is 0.75.

19. The invention of claim 16, said reflector further comprising a length of not more than 7 millimeters and a diameter of not more than 2 millimeters.

20. The invention of claim 19, wherein said inverted corresponding image is focused at said second planar end.

\* \* \* \* \*